US008336039B2

(12) United States Patent
Kawahito et al.

(10) Patent No.: US 8,336,039 B2
(45) Date of Patent: Dec. 18, 2012

(54) PROGRAM, APPARATUS, AND METHOD OF OPTIMIZING A JAVA OBJECT

(75) Inventors: Motohiro Kawahito, Kanagawa-ken (JP); Takeshi Ogasawara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 12/826,820

(22) Filed: Jun. 30, 2010

(65) Prior Publication Data

US 2011/0004869 A1 Jan. 6, 2011

(30) Foreign Application Priority Data

Jul. 2, 2009 (JP) .................................. 2009-158204

(51) Int. Cl.
*G06F 9/45* (2006.01)
(52) U.S. Cl. ......................................................... 717/151
(58) Field of Classification Search ........... 717/151–154
See application file for complete search history.

(56) References Cited

U.S. PATENT DOCUMENTS

| 2004/0205165 | A1* | 10/2004 | Melamed et al. | ............. | 709/219 |
| 2006/0155791 | A1 | 7/2006 | Tene et al. | | |
| 2007/0083856 | A1* | 4/2007 | Chilimbi et al. | ............. | 717/128 |
| 2009/0019432 | A1* | 1/2009 | Kondo | ............. | 717/153 |
| 2009/0199162 | A1* | 8/2009 | Choi et al. | ............. | 717/124 |
| 2010/0162099 | A1* | 6/2010 | Bernstein et al. | ............. | 715/235 |
| 2011/0167242 | A1* | 7/2011 | de Jong et al. | ............. | 712/205 |

FOREIGN PATENT DOCUMENTS

| JP | 07-036709 A | 2/1995 |
| JP | 2000-222219 A | 8/2000 |
| JP | 2003-216442 A | 7/2003 |

OTHER PUBLICATIONS

Shankar, et al., "Runtime Specialization With Optimistic Heap Analysis," OOPSLA'05, Oct. 16-20, 2005.

* cited by examiner

*Primary Examiner* — Anna Deng
(74) *Attorney, Agent, or Firm* — Vazken Alexanian

(57) ABSTRACT

An apparatus, method and article of manufacture tangibly embodying computer readable instructions for optimizing a Java object on a target computer program. The apparatus includes: a storage unit for storing a value of the object and management information on the object in association with each other; a code generation unit for generating, from the target computer program, optimized code and unoptimized code; a switching unit for switching from executing the target computer program using the optimized code to executing the target computer program using the unoptimized code in response to an event in which the value of the object is written while the target computer program is executed by using the optimized code; and a management unit for managing the object by accessing the management information by a non-detection write operation in which writing to the object is performed without being detected.

14 Claims, 12 Drawing Sheets

```
static final byte map[];
byte a[];
int i;
while(true) if (map[a[i++] & 0xff] == 1) break;
```

FIG. 3A

```
unsigned byte table[];
unsigned byte a[];
int i;
while(true) if (table[a[i++]] != 0) break;
```

FIG. 3B

```
static final byte map[];
static int initialized = false;
static byte compiler_map[];   // ARRAY GENERATED BY COMPILER
byte a[];
int i;
if (!initialized && map.read_only) {
initialized = true;    // INITIALIZE ARRAY
   for (int j = 0; j < 256; j++) compiler_map[j] = (map[j] == 1);
}
if (map.read_only) {
while(true) if (compiler_map[a[i++]] & 0xff] != 0) break;
    // OPTIMIZED CODE => TRT INSTRUCTION
} else {
while(true) if (map[a[i++]] & 0xff] == 1) break;  // ORDINARY CODE
}
```

FIG. 3C

```
private static final int datasizes_M[] = {50000,100000,500000};
private static final int datasizes_N[] = {50000,100000,500000};
private static final int datasizes_nz[] = {250000,500000,2500000};

for (int i=0; i<datasizes_nz[size]; i++) {
      // generate random row index (0, M-1)
      row[i] Math.abs(R.nextInt()) % datasizes_M[size];

// generate random columun index (0, N-1)
      col[i] Math.abs(R.nextInt()) % datasizes_N[size];

val[i] = R.nextDouble();
  }
```

FIG. 4A

```
  If (size == 1) {
     if (datasizes_M.read_only && datasizes_N.read_only && datasizes_nz.read_only)
{
        static boolean check = false;
        static boolean modified = false;

if (!check) { // EXECUTE ONLY ONCE
           check = true;
           if (datasizes_M[1] != 100000 || datasizes_N[1] != 100000 ||
datasizes_nz[1] != 500000)
              modified = true;
        } if (!modified){
           for (int i=0; i<500000; i++) {

// generate random row index (0, M-1)
           row[i] = Math.abs(R.nextInt()) % 100000; =>  THIS CAN BE CALCULATED
              WITH MULTIPLICATION, LEADING TO FASTER PROCESSING // generate random row index (0, N-1)
           col[i] = Math.abs(R.nextInt()) % 100000; =>  THIS CAN BE CALCULATED
              WITH MULTIPLICATION, LEADING TO FASTER PROCESSING
           val[i] = R.nextDouble();
        }
     } else {
        goto ORIGINAL CODE
     }
   } else {
      goto ORIGINAL CODE
  }
}
```

FIG. 4B

PROGRAM, APPARATUS, AND METHOD OF OPTIMIZING A JAVA OBJECT

CROSS-REFERENCE TO RELATED APPLICATIONS

This application claims priority under 35 U.S.C. §119 to Japanese Patent Application No. 2009-158204 filed Jul. 2, 2009, the entire contents of which are incorporated by reference herein.

BACKGROUND OF THE INVENTION

1. Field of the Invention

The present invention relates to a computer program product, an apparatus, and a method of optimizing a Java object as a constant object.

2. Description of the Related Art

In Java (Registered Trademark), which is an object-oriented language, the JVM (Java Virtual Machine) can be used to compile byte code of a Java program written in an intermediate language into native code instead of executing the byte code via an interpreter. The native code can be directly executed by a processor, where the program can be executed at higher speed.

When JVM compiles byte code, optimization can often be processed on the condition that the value of the object accessed by the byte code remains constant for a certain period of time. JVM processes such optimization, and disables the optimization when it detects a writing to the object. In such a case, the detection of writing by using software involves high operation cost. Further, the detection of writing by using a page protection system causes a problem of attribute-change cost for changing the attribute of an area back into a rewritable state and thus causing a problem of accompanied cost for suspending a thread (refer to U.S. Patent Application No. 2006/0155791 and Ajeet Shankar et al., "Runtime Specialization With Optimistic Heap Analysis," OOPSLA'05, Oct. 16-20, 2005, San Diego, Calif., USA).

SUMMARY OF THE INVENTION

An apparatus, method and article of manufacture tangibly embodying computer readable instructions for optimizing a Java object on a target computer program are provided.

A first aspect of the present invention provides an apparatus for optimizing a Java object which includes:

a storage unit for storing a value of the object and management information on the object in association with each other;

a code generation unit for generating, from the target computer program, optimized code that is optimized on the condition that the value of the object is constant, and unoptimized code that is to be executed in a case where the value of the object is changed;

a switching unit for switching from executing the target computer program by using the optimized code to executing the target computer program by using the unoptimized code in response to an event in which the value of the object is written while the target computer program is executed by using the optimized code; and a management unit for managing the object by accessing the management information by a non-detection write operation in which writing to the object is performed without being detected.

According to another aspect of the present invention, an apparatus is provided for optimizing a Java object on a target computer program.

The apparatus includes:

a storage unit for storing a value of the object and management information on the object in association with each other;

a code generation unit for generating, from the target computer program, optimized code that is optimized on the condition that the value of the object is constant, and unoptimized code that is to be executed in a case where the value of the object is changed;

a switching unit for switching from executing the target computer program by using the optimized code to executing the target computer program by using the unoptimized code in response to an event in which the value of the object is written while the target computer program is executed by using the optimized code;

a management unit for managing the object by accessing the management information by a non-detection write operation in which writing to the object is performed without being detected;

a physical memory area mapped to both a write-disabled virtual area where writing is disabled and a write-enabled virtual area where writing is enabled in a virtual memory space.

According to still another aspect of the present invention, a method is provided for optimizing a Java object on a target computer program.

The method includes:

storing a value of the object and management information on the object in association with each other in a storage unit;

generating, by a code generation unit from the target computer program, optimized code that is optimized on the condition that the value of the object is constant, and unoptimized code that is to be executed in a case where the value of the object is changed;

switching, by a switching unit from executing the target computer program, by using the optimized code to executing the target computer program by using the unoptimized code in response to an event in which the value of the object is written while the target computer program is executed by using the optimized code; and managing the object by a management unit accessing the management information by a non-detection write operation in which writing to the object is performed without being detected.

BRIEF DESCRIPTION OF THE DRAWINGS

FIG. 3A illustrates an exemplary Java program from which a code generation unit generates optimized code in an embodiment of the present invention;

FIG. 3B illustrates exemplary pseudo code of an instruction used in optimized code generated by the code generation unit in an embodiment of the present invention;

FIG. 3C illustrates exemplary pseudo code of optimized code generated by the code generation unit for the Java program in FIG. 3A in an embodiment of the present invention;

FIG. 4A illustrates another exemplary Java program from which the code generation unit generates optimized code in an embodiment of the present invention;

FIG. 4B illustrates exemplary pseudo code of optimized code generated by the code generation unit for the Java program in FIG. 4A;

DETAILED DESCRIPTION OF THE PREFERRED EMBODIMENTS

The present invention is described below through embodiments of the invention. However, the embodiments below do not intend to limit the scope of the invention in accordance with claims. Furthermore, all combinations of features described in the embodiments are not always required as solving means of the invention.

Figure 1:
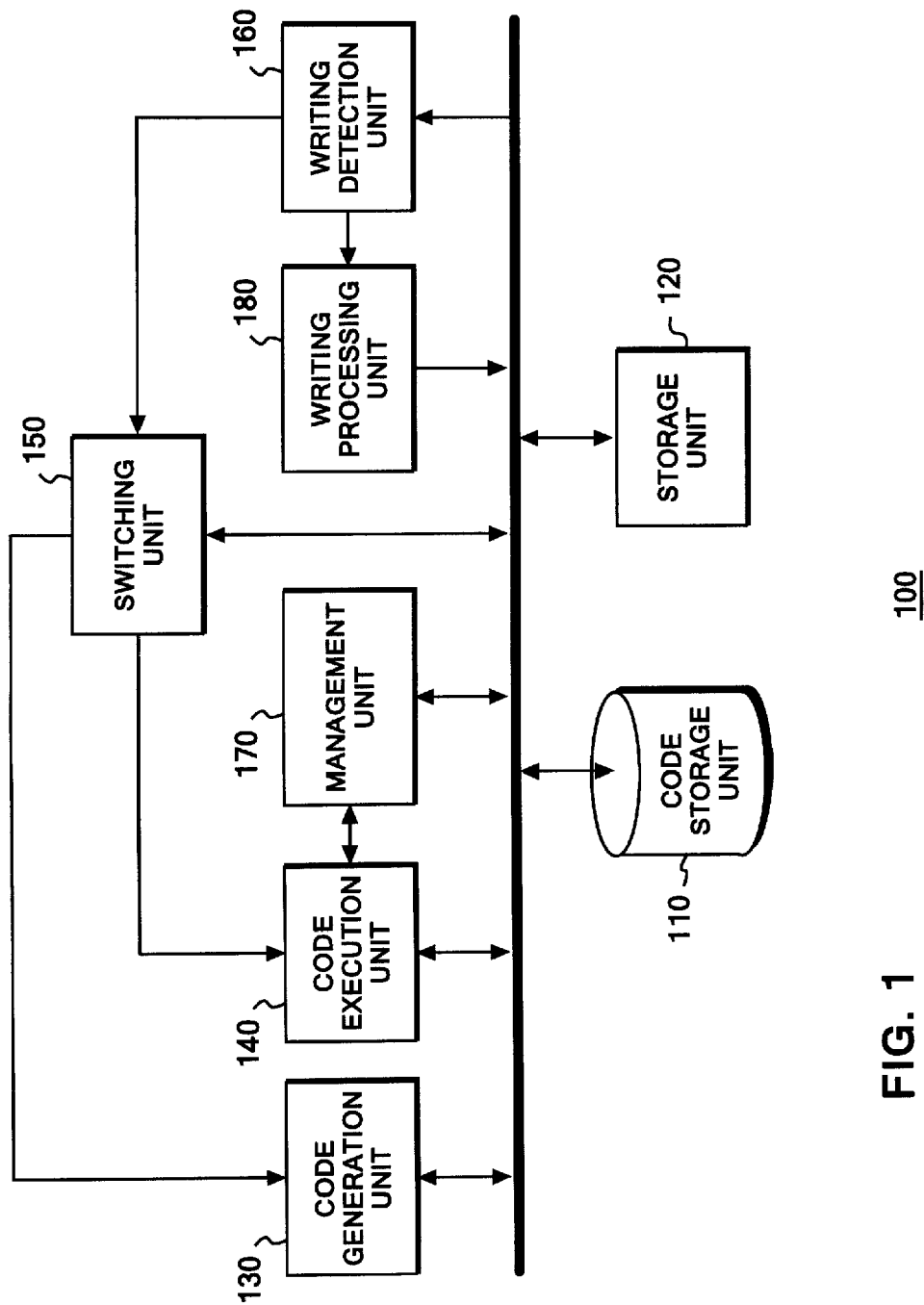
FIG. 1 illustrates an exemplary configuration of an apparatus in accordance with an embodiment of the present invention.

Referring to FIG. 1, an illustration provides an exemplary configuration of an apparatus 100 in accordance with an embodiment of the present invention. The apparatus 100 includes a code storage unit 110, a storage unit 120, a code generation unit 130, a code execution unit 140, a switching unit 150, a writing detection unit 160, a management unit 170, and a writing processing unit 180. The code storage unit 110 stores therein program code to be executed by the apparatus 100. The code storage unit 110 can be a non-volatile storage device such as a hard-disk drive of a computer. The code storage unit 110 can store therein intermediate code such as byte code of the Java language as program code.

The storage unit 120 stores therein a value of an object and management information on the object in association with each other. The storage unit 120 can be a memory of a computer. Further, the storage unit 120 can store as an object a memory image of a class instance of the Java language. The storage unit 120 can store the management information on an object in an object header which is allocated near object data (e.g., before the object data or on the same page as the object data).

The code generation unit 130 generates optimized code and unoptimized code from a target program. The optimized code is optimized on the condition that the value of an object is constant and the unoptimized code is to be executed when the value of the object is changed. The code generation unit 130 can be implemented by a JVM. When a target program is executed, the code generation unit 130 can generate the optimized code and/or unoptimized code from the target program in the form of intermediate code of a class corresponding to the object, by referring to the execution profile of the target program.

The code execution unit 140 executes a target program. The code execution unit 140 can be implemented by a JVM. The code execution unit 140 can execute optimized code or unoptimized code generated by the code generation unit 130.

When the switching unit 150 switches from the execution of the target program by using the unoptimized code to the execution of the target program by using the optimized code, the switching unit 150 can set the writing to the value of an object as detectable. The switching unit 150 can use system-call API, for example, to set a page attribute stored in a page table entry (PTE) used in a virtual memory system. Here, the page attribute includes a privilege-level field and/or an access-right field for instructing prohibition of writing. By setting the page attribute, the switching unit 150 can make writing to the value of the object detectable in response to an exception such as a privilege violation exception and access-right exception.

The writing detection unit 160 detects a write instruction that accesses the storage unit 120. The switching unit 150 can use the system-call API to register the writing detection unit 160 as a handler to be executed in response to an exception involving the write instruction. Here, an example of such handler is an SEGV (Segmentation Violation) handler that is to be executed in response to the privilege violation exception or access-right violation exception involving the write instruction. The writing detection unit 160 can enable only writing with a higher privilege level than a privilege level for executing optimized code or unoptimized code.

In response to a detection of writing to the value of the object while the target program is executed by using the optimized code, the switching unit 150 switches from executing the target program by using the optimized code to executing by using the unoptimized code. The switching unit 150 can use the SEGV handler to switch from executing the target program by using the optimized code to executing by using the unoptimized code. In this way, the code execution unit 140 can execute the optimized code as long as writing does not occur.

The management unit 170 manages the object by accessing management information through a non-detection write operation in which writing to the object is performed without being detected. The management unit 170 can access the management information on the object by using a write instruction that does not generate a privilege violation exception, e.g., a write instruction with a higher privilege level than a privilege level of a page corresponding to the object. The management unit 170 can access the management information on the object by using an address within a logical memory space that does not generate an access-right violation exception. In this way, the writing detection unit 160 does not detect that the management unit 170 performs writing to the object, whereby the management unit 170 can access the management information on the object at higher speed.

When detecting a writing to the object via a write-disabled virtual area, the writing processing unit 180 processes the writing via a write-enabled virtual area. The writing processing unit 180 can access the management information on the object by using an address within a logical memory space that does not generate the access-right violation exception. In this way, the writing detection unit 160 does not detect that the writing processing unit 180 performs writing to the object, whereby the management unit 170 can access the management information at higher speed.

Figure 2:
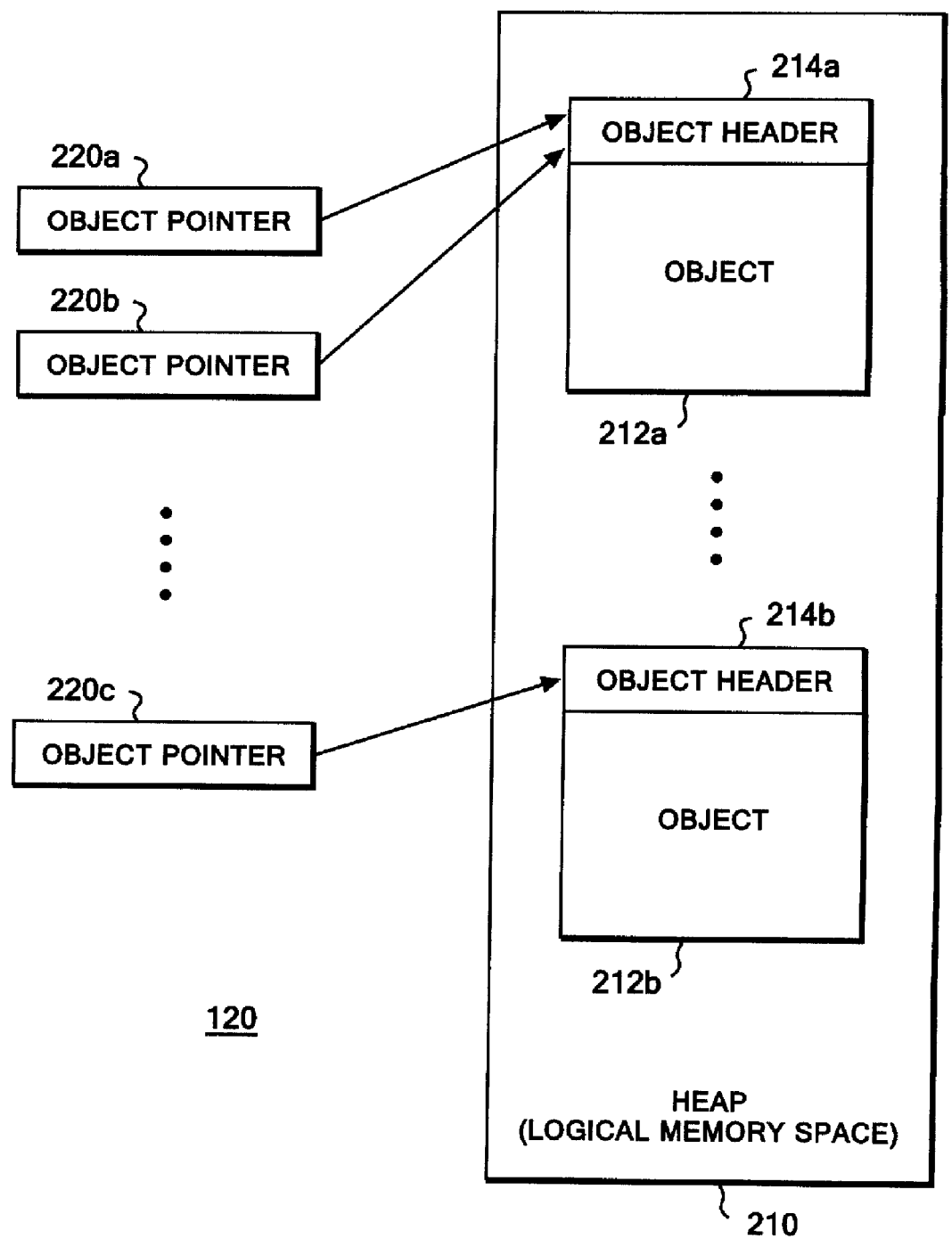
FIG. 2 illustrates an exemplary configuration of a storage unit in accordance with an embodiment of the present invention.

FIG. 2 illustrates an exemplary configuration of the storage unit 120 in accordance with the embodiment of the present invention. The storage unit 120 includes a heap 210. The storage unit 120 can include one or more object pointers (oop) 220a to 220c. The heap 210 is an area for storing therein objects and the like used in the target program.

The heap 210 includes one or more objects 212a to 212b. The one or more objects 212a to 212b include object headers 214a to 214b, respectively. The object pointers 220a to 220c each include one of the addresses of the objects 212a to 212b. For example, each of the object pointers 220a to 220c can be a reference to one of the objects 212a to 212b.

For each of the objects 212a to 212b, the storage unit 120 can store a thread ID of a thread that is to hold lock on the object in a corresponding one of the object headers 214a to 214b. When the switching unit 150 is implemented by using a concurrent GC (Garbage Collector) designed to minimize suspended duration of an application thread, the storage unit 120 can store a state variable used by the concurrent GC in each of the object headers 214a to 214b of the respective objects 212a to 212b.

The storage unit 120 stores, as a part of the management information on the object, optimization information that indicates whether the object is to be optimized or not. The storage unit 120 can store become_barrier flag as the optimization information in each of the object headers 214a to 214b of the objects 212a to 212b. Here, the become_barrier flag indicates that each of the objects 212a to 212b should be set to be protected by write barrier.

FIG. 3A illustrates an exemplary Java program from which the code generation unit 130 generates optimized code in the embodiment of the present invention. For an input array "a", the Java program in FIG. 3A instructs a processor to search the array "a" until the value translated from the array "a" according to a translation table "map" is equal to 1.

FIG. 3B illustrates exemplary pseudo code of an instruction that is used in the optimized code generated by the code generation unit 130 in the embodiment. Specifically, FIG. 3B illustrates pseudo code of a TRT (Translation and Test) instruction of the IBM System z (Registered Trademark). The TRT instruction instructs a processor to search the array "a", i.e., the first operand, until the value translated according to the translation table "map", i.e., the second operand, is not zero. As described, the code generation unit 130 can generate optimized code using a CISC instruction that is processed by a processor using a micro program.

FIG. 3C illustrates exemplary pseudo code of optimized code that is generated by the code generation unit 130 for the Java program in FIG. 3A in the embodiment of the present invention. The storage unit 120 can store, as at least a part of the management information on the object, write-restriction information indicating whether writing to the object by the target program is restricted or not. The storage unit 120 can store read_only flag as the write-restriction information in the object header of a corresponding object. Here, the read_only flag indicates that writing to the object is disabled. In the pseudo code in FIG. 3C, the translation table "map" contains the read_only flag.

When the target program is executed with the unoptimized code, the switching unit 150 writes write-restriction information, indicating that writing to the value of an object by the target program is not restricted, into the management information on the object. When the target program is executed with the optimized code, the switching unit 150 writes write-restriction information, indicating that writing to the value of the object is restricted, into the management information on the object. The switching unit 150 can perform writing to the value of the read_only flag as the write-restriction information.

When the write-restriction information indicating that writing to the value of the object by the target program is restricted is stored, the management unit 170 executes the target program with the optimized code. When the write-restriction information indicating that writing to the value of the object by the target program is not restricted is stored, the management unit 170 executes the target program with the unoptimized code. The management unit 170 can be implemented by branch code for branching to the optimized code or the unoptimized code depending on the read_only flag of the target object. Further, the management unit 170 can be implemented, instead, by switching multiple virtual method tables each of which stores the address of the optimized code or unoptimized code for each method of the class of the object, and through which the optimized code or unoptimized code is called by an invokevirtual instruction using the method as a parameter.

In order to optimize the Java program in FIG. 3A with the TRT instruction, the code generation unit 130 can generate optimized code for generating an array "compiler_map" corresponding to the translation table "map". The code generation unit 130 can further generate unoptimized code that does not use the TRT instruction or the array "compiler_map" and also generate branch code for branching to the optimized code or the unoptimized code.

The code execution unit 140 can repeatedly use the array "compiler_map" as long as the translation table "map" is not newly overwritten. When the read_only flag is set for the translation table "map" (i.e., when the value thereof is true), the code execution unit 140 determines that the translation table "map" is not newly overwritten, and then searches the array "a" by using the TRT instruction and the array "compiler_map". In contrast, when the read_only flag is not set for the translation table "map" (i.e., when the value thereof is false), the code execution unit 140 determines that the translation table "map" has been overwritten, and then executes the unoptimized code without using the TRT instruction or the array "compiler_map".

FIG. 4A illustrates another exemplary Java program from which the code generation unit 130 generates optimized code in the embodiment. The Java program is a part of a benchmark suite distributed by Java Grande Forum.

FIG. 4B illustrates exemplary pseudo code of optimized code that is generated by the code generation unit 130 for the Java program in FIG. 4A in the embodiment of the present invention. When the read_only flag is set for a variable "size", an array "datasizes_M", an array "datasizes_N", and an array "datasizes_nz" in the Java program, the code generation unit 130 can execute a residue calculation with a constant in the optimized code, instead of a residue calculation for calculating the value of an array "row" and an array "col". In this way, an array boundary check and a loading instruction can be spared or reduced, whereby the code execution unit 140 can execute the Java program at higher speed. Further, the code generation unit 130 can generate optimized code using a multiplication or addition calculation with a constant, instead of a residue calculation with a constant. In this way, since the residue calculation is not used, the code execution unit 140 can execute the Java program at even higher speed.

Figure 5A:
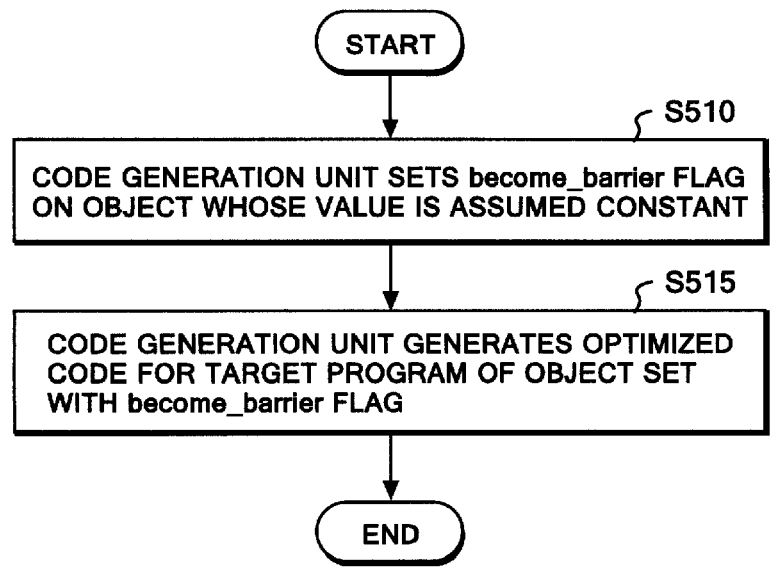
FIG. 5A illustrates an exemplary processing flow of a code generation unit in accordance with an embodiment of the present invention.

FIG. 5A illustrates an exemplary processing flow of the code generation unit 130 in accordance with another embodiment of the present invention. In order to optimize an object on the condition that the value of the object is constant, the code generation unit 130 sets the object with optimization information indicating that the object is to be optimized (S510). The code generation unit 130 can set become_barrier flag in the object header of the object. When the target program of the object is a method, the code generation unit 130 may assume that the value of the object is constant on the basis of the calling profile of the method.

Further, when the code generation unit 130 refers to the calling profile of the method and confirms that the method includes a write instruction to the object set with the become_barrier flag, the code generation unit 130 may reset the become_barrier flag. In this way, when the write instruction to the value of the object is highly likely to be executed, the code generation unit 130 can exclude the object from targets to be optimized.

The code generation unit 130 generates the optimized code of the target program of the object set with the become_barrier flag (S515). At Step S620, the code generation unit 130 translates writing to the value of the object by the target program into an unprivileged write instruction. The unprivileged write instruction is an instruction with which writing to an unprivileged write-disabled area generates a privilege violation exception. When writing to the unprivileged write-disabled area is performed in response to the unprivileged write instruction, the writing detection unit 160 can detect a target address and target data of the writing along with the privilege violation exception.

The management unit 170 can use a privileged write instruction to process writing to the management information on the object. The privileged write instruction is an instruction with which writing to the unprivileged write-disabled area is enabled.

Figure 5B:
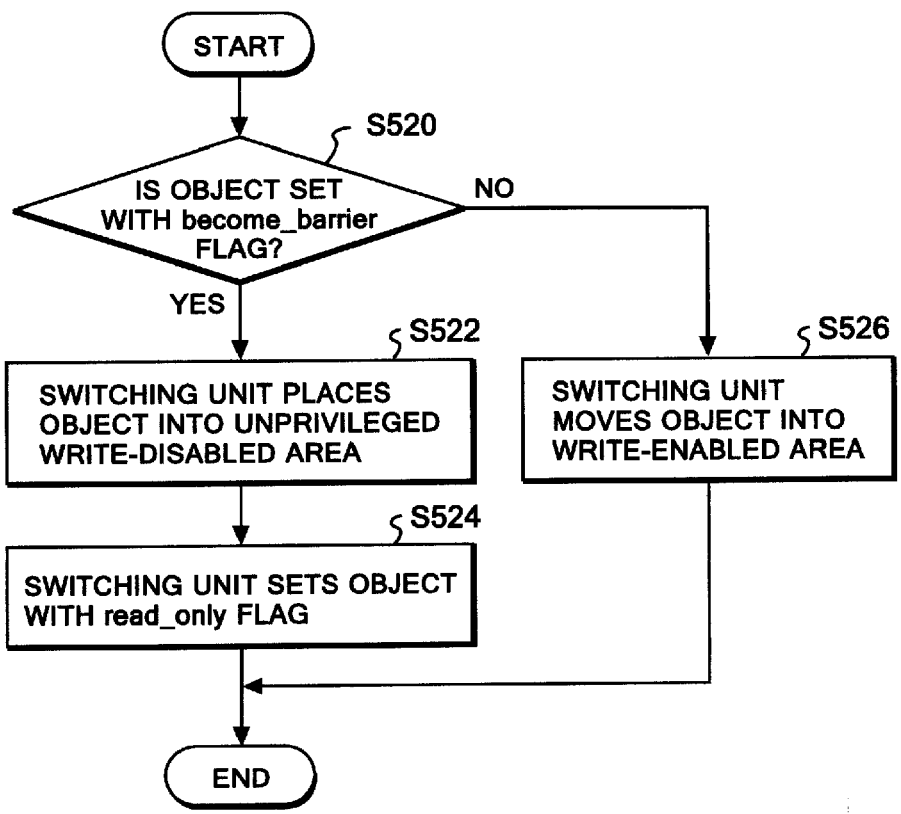
FIG. 5B illustrates an exemplary processing flow of a switching unit in accordance with an embodiment of the present invention.

FIG. 5B illustrates an exemplary processing flow of the switching unit 150 in accordance with the embodiment of the present invention. During the garbage collection which examines objects stored in the storage unit 120 and releases objects not used by the target program from the storage unit 120, the switching unit 150 determines whether or not each object is set with the become_barrier flag for instructing the execution of the target program of the object with the optimized code (S520).

When the target program of the object is to be executed with the optimized code, the switching unit 150 places the object into the unprivileged write-disabled area in order to set write barrier to the object (S522). In the unprivileged write-disabled area, writing by the privileged write instruction is performed without being detected while writing by the unprivileged write instruction is detected. For example, when an object in the write-enabled area examined during the garbage collection is set with the become_barrier flag (S520: Yes), and when the optimization information indicating that the object is to be optimized is stored in association with the object, the switching unit 150 moves the object into the unprivileged write-disabled area (S522).

When the optimization information indicating that the object is to be optimized is stored in association with the object, the switching unit 150 switches to executing the target program by using the optimized code (S524). The switching unit 150 can set the read_only flag of the object to switch to executing the target program by using the optimized mode.

In contrast, when an object is not set with the become_barrier flag and the target program of the object is to be executed by using the unoptimized code (S520: No), the switching unit 150 places the object into the write-enabled area in the storage unit 120 where neither writing by the privileged write instruction nor writing by unprivileged write instruction is detected (S526).

Figure 5C:
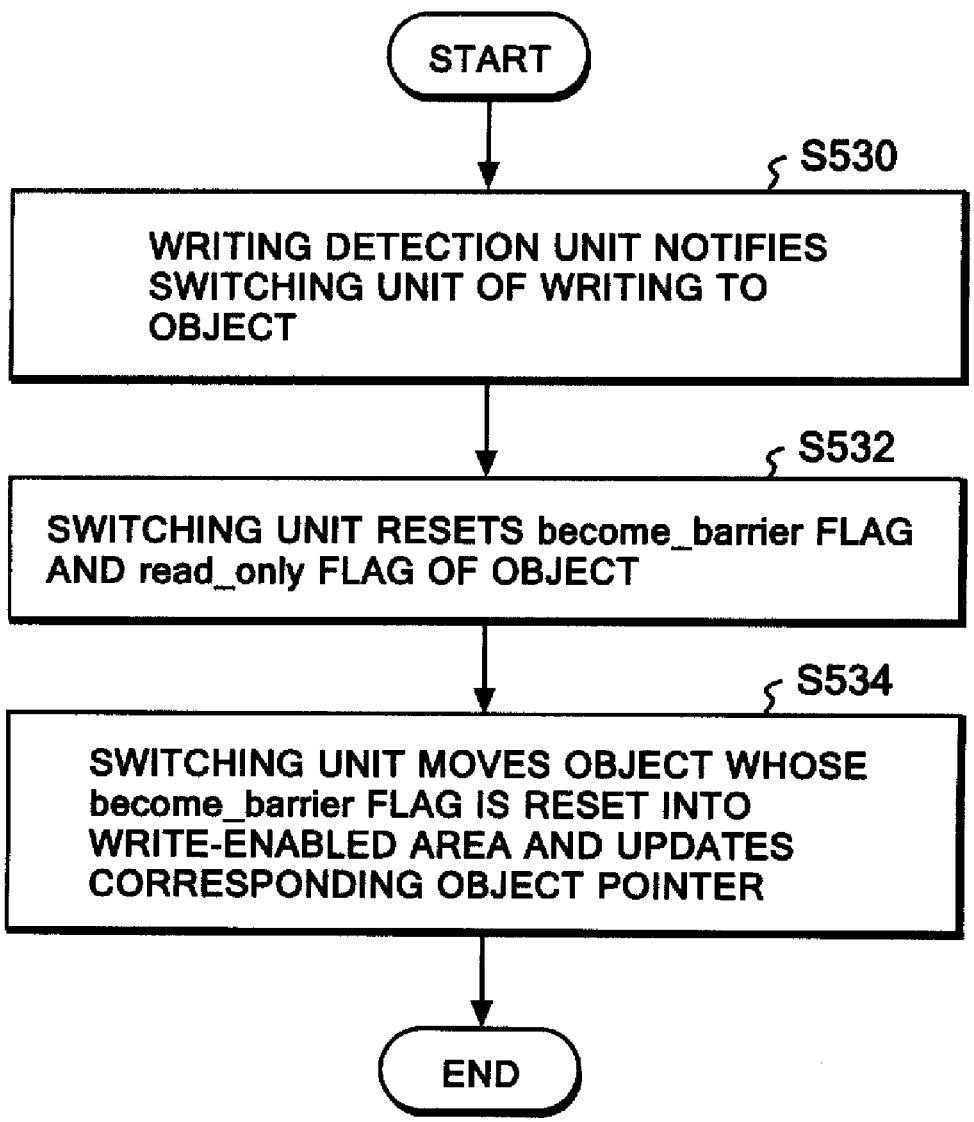
FIG. 5C illustrates an exemplary processing flow of the switching unit and a writing detection unit in accordance with an embodiment of the present invention.

FIG. 5C illustrates an exemplary processing flow of the switching unit 150 and the writing detection unit 160 in accordance with the embodiment of the present invention. Upon detecting a writing to the object placed in the unprivileged write-disabled area, the writing detection unit 160 notifies the switching unit 150 of the writing (S530).

Upon the occurrence of a writing to an object placed in the unprivileged write-disabled area, the switching unit 150 sets the object with the writing restriction information indicating that the writing to the value of the object is not restricted, and the optimization information indicating that the object is not to be optimized. For example, in response to the notification of the writing sent from the writing detection unit 160, the switching unit 150 resets the read_only flag and become_barrier flag (S532) of the corresponding object. In this way, the code execution unit 140 executes the unoptimized code for the object.

The switching unit 150 can move an object in the unprivileged write-disabled area into the write-enabled area when the switching unit 150 examines the object during the garbage collection and confirms that the optimization information indicating that the object is not to be optimized is stored in association with the object. For example, when the switching unit 150 finds an object placed in the unprivileged write-disabled area and having the become_barrier flag reset during the garbage collection, the switching unit 150 can move the found object into the write-enabled area, then reset the corresponding read_only flag and update the corresponding object pointer (S534). The switching unit 150 can perform the moving when one or more objects in the heap are marked and swept during the garbage collection. In this way, the switching unit 150 can suppress an increase in the number of times that the objects are moved.

Figure 6:
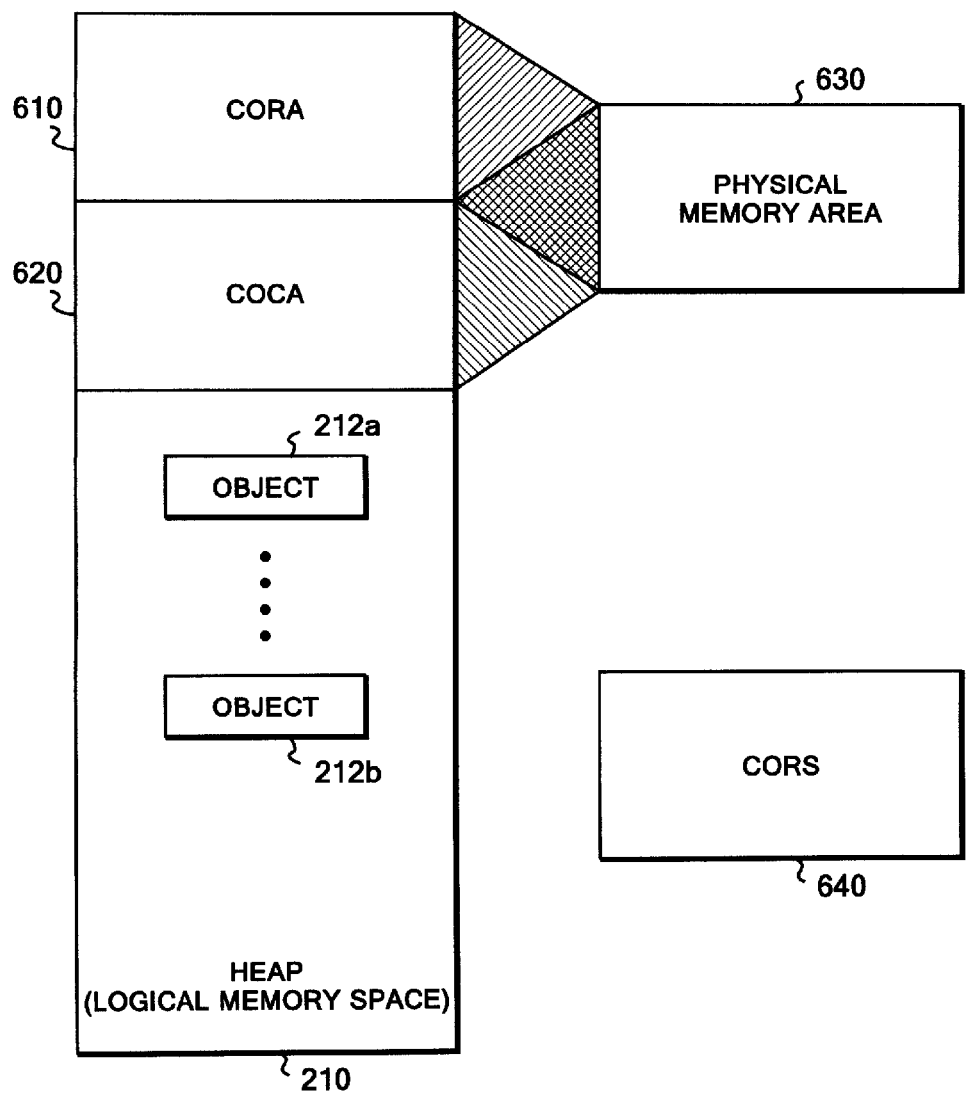
FIG. 6 illustrates an exemplary storage unit in accordance with an embodiment of the present invention.

FIG. 6 illustrates an exemplary storage unit 120 in accordance with still another embodiment of the present invention. When causing the target program to be executed with the optimized code, the switching unit 150 places an object into a physical memory area that is mapped to both the write-disabled virtual area where the writing is disabled and the write-enabled virtual area where the writing is enabled in the virtual memory space. The storage unit 120 stores one or more objects 212a to 212b in the heap 210. Further, the storage unit 120 includes a constant objects reference area (CORA) 610 that is an exemplary write-disabled virtual area where the writing is disabled in the virtual memory space, an objects copy area (COCA) 620 that is an exemplary write-enabled virtual area where the writing is enabled in the virtual memory space, and a physical memory area 630 that is mapped to both the CORA 610 and the COCA 620, and a constant objects remember set (CORS) 640 where objects whose values are deemed constant are registered.

For reserving these areas, the switching unit 150 can use AIX (Registered Trademark), for example, which is a commercially available operating system based on UNIX (Registered Trademark). More specifically, the switching unit 150 can reserve the COCA 620 mapped to the physical memory area 630 by using shmat system-call API for reserving a shared memory space. Further, the switching unit 150 can reserve the CORA 610 mapped to the same physical memory area 630 by using the shmat system-call API along with SHM_RDONLY flag for instructing the reserving of the write-disabled area.

The switching unit 150 can make such allocation that each of the objects to be optimized can be stored in one of an address position in the write-disabled virtual area and an address position in the write-enabled virtual area which are shifted from each other by a predetermined offset. In this way, the switching unit 150 can easily translate the address position in the write-disabled virtual area into the address position in the write-enabled virtual area and vice versa by performing the addition and subtraction of the offset.

Figure 7A:
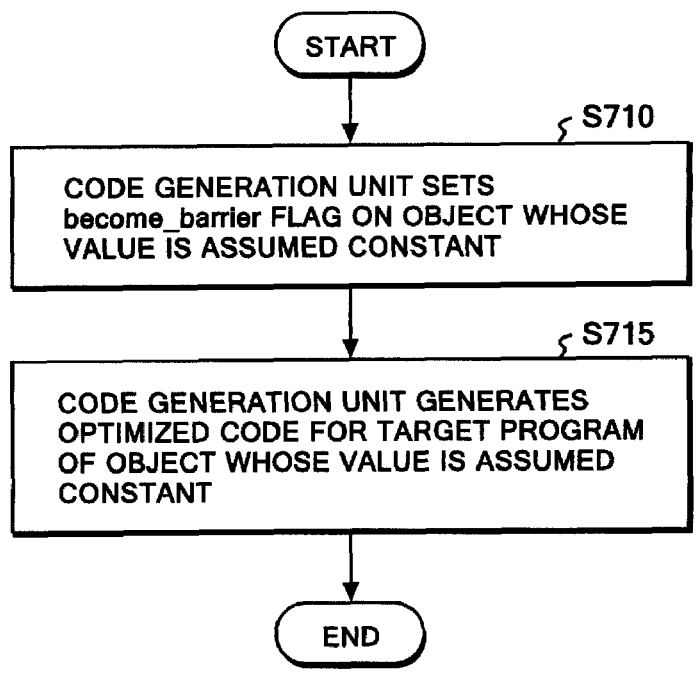
FIG. 7A illustrates an exemplary processing flow of a code generation unit in accordance with an embodiment of the present invention.

FIG. 7A illustrates an exemplary processing flow of the code generation unit 130 in accordance with the embodiment of the present invention. The code generation unit 130 notifies the switching unit 150 of an object whose value is assumed constant (S710). Similar to Step S510, the code generation unit 130 can notify the switching unit 150 by setting the become_barrier flag in the object header for the object.

In order to determine whether the value of the object is constant or not, the code generation unit 130 can use a calling profile of a method in a class of the object. Take as an example an object of the Hashtable class, which is included in the standard library of the Java language. When it is determined that the get method that returns an object corresponding to the key value of the Hashtable-class object is repeatedly called during a predetermined period of time, the code generation unit 130 can generate the optimized code of the get method. As the calling profile of a method, the code generation unit 130 can use polymorphic inline cache (PIC) that stores therein two or more method look-up results corresponding to the call sites of the method.

The code generation unit 130 generates the optimized code of the target program for the object whose value is assumed constant (S715). The code generation unit 130 can generate the code for processing the writing to the value of the object by the target program via the write-disabled virtual area.

Figure 7B:
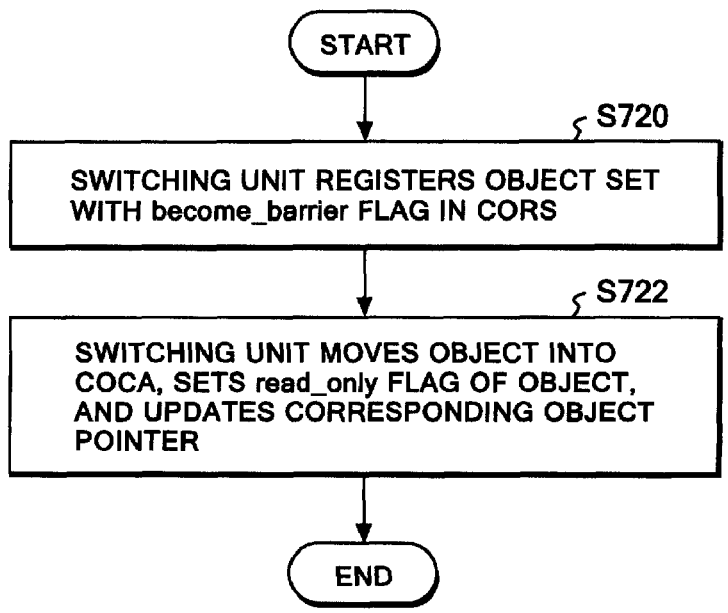
FIG. 7B illustrates an exemplary processing flow of a switching unit in accordance with an embodiment of the present invention.

FIG. 7B illustrates an exemplary processing flow of the switching unit 150 in accordance with the embodiment of the present invention. During the garbage collection, the switching unit 150 registers an object set with the become_barrier flag in the CORS 640 (S720). The switching unit 150 can register the object pointer, pointing to the object, in the CORS 640.

During the garbage collection, the switching unit 150 moves the object to the COCA 620, sets the read_only flag of the object, and updates the corresponding object pointer (S722). Similar to the previously discussed embodiment of the present invention, the switching unit 150 can perform the moving when objects in the heap are marked and swept during the garbage collection. In this way, the switching unit 150 can suppress an increase in the number of times that the objects are moved.

The management unit 170 can process the writing to the management information on the object via the write-enabled virtual area. In this way, the management unit 170 can perform the writing without being detected by the writing detection unit 160.

Further, the management unit 170 can calculate the address position in the write-enabled virtual area of the object on the basis of the address position in the write-disabled virtual area of the object and the offset, and then write the management information on the object by using the calculated address position. In this way, the management unit 170 can write the management information on the object via the write-enabled virtual area by using the write instruction with the specified offset address value and the address position in the write-disabled virtual area of the object. Further, the management unit 170 can write the management information on the object via the write-disabled virtual area when the frequency of writing the management information on the object is lower than a predetermined standard frequency. Further, when the frequency of the writing is equal to or higher than the standard frequency, the management unit 170 can write the management information on the object via the write-enabled virtual area on condition that the object is placed in the physical memory area that is mapped to the write-disabled virtual area and the write-enabled virtual area.

Figure 7C:
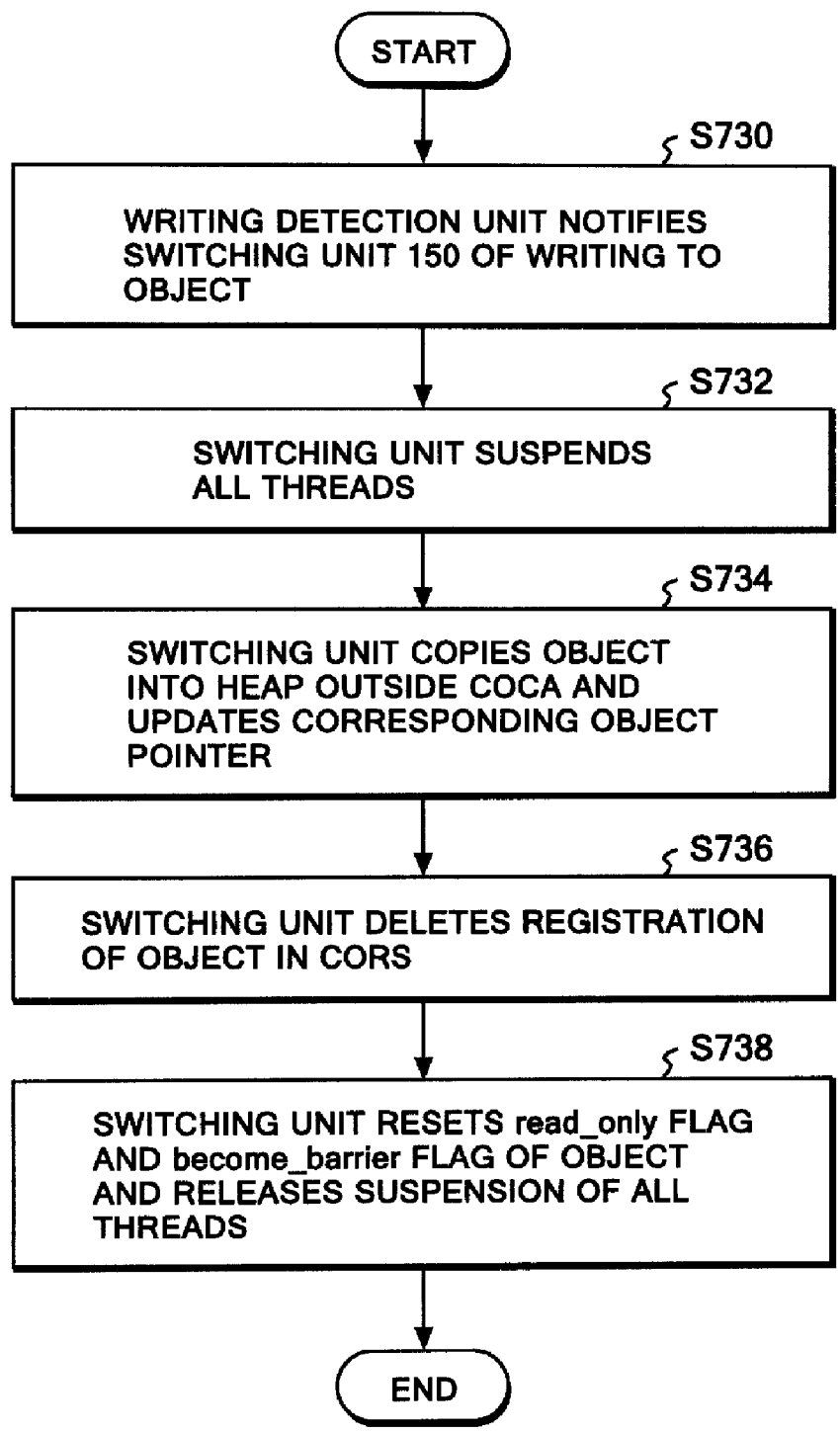
FIG. 7C illustrates an exemplary processing flow of the switching unit and a writing detection unit in accordance with an embodiment of the present invention.

FIG. 7C illustrates an exemplary processing flow of the switching unit 150 and the writing detection unit 160 in accordance with the embodiment of the present invention. The writing detection unit 160 notifies the switching unit 150 of the writing to the object (S730).

In response to the notification, the switching unit 150 instructs the code execution unit 140 to suspend all threads (S732). In order for the switching unit 150 to securely update the object pointer, the code execution unit 140 can suspend the threads at a safe point in the optimized or unoptimized code where all GC routes are viewable by GC and all objects in the heap are consistent with each other.

When causing the target program to be executed with the unoptimized code, the switching unit 150 moves the object to the physical memory area that is mapped to the write-enabled virtual area in the storage unit 120. For example, the switching unit 150 moves the object, the writing on which has been notified, to a heap 210 located outside the COCA 620, and then updates the object pointer of the object (S734). The switching unit 150 deletes the registration of the object in the CORS 640 (S736).

The switching unit 150 resets the read_only flag and the become_barrier flag of the object in order to make the code execution unit 140 execute the target program of the object by using the unoptimized code, and releases all suspension on all threads (S738).

At Step S715, in the optimized code in process of generation, the code generation unit 130 can remove wait code for obtaining lock on the object placed in the write-disabled virtual area by the switching unit 150, and then set, instead, safe points before and after a code block related to the lock, that is, for example, a synchronized block that uses the object as a parameter in the Java program. Alternatively, instead of removing the wait code for obtaining the lock on the object, the code generation unit 130 can generate branch code in the optimized code in process of generation. This branch code instructs the code execution unit 140 to execute the wait code when the read_only flag value of the object is false. Further, when an executed thread is on "wait" in the synchronized block, the code generation unit 130 can insert code for setting the read_only flag value to false into the position immediately before the synchronized block.

In addition, at Step S732, when the thread that is writing to a target object is detected by the writing detection unit 160 does not hold lock on the target object, the switching unit 150 can instruct the code execution unit 140 to suspend the running thread that holds the lock on the target object at a safe point outside the code block related to the lock and also suspend other running threads at the next safe point. Further, when a thread performing writing to the target object holds the lock on the object, the switching unit 150 can instruct the code execution unit 140 to suspend other running threads at the next safe point.

In order to determine whether each thread is to hold the lock on a target object or not, the code execution unit 140 can determine, at the safe point reached by the thread, whether the target object is included in a hash table to which all objects to be locked by the thread are registered. Specifically, the code execution unit 140 determines whether or not the pointer of the target object is included in a hash table or the like for managing pointers of all objects to be locked. When the number of all objects to be locked by the thread is quite low, the code execution unit 140 can determine whether each thread is to hold lock on a target object or not by employing the direct comparison of the pointer values, instead of using the hash table or the like. In this way, the code execution unit 140 can execute the optimized code that is free from the lock, which involves high operation cost. For example, this is often applied in the Java standard library and is effective to overcome the bottleneck of the multi-thread environment with the get method of the Hashtable class that obtains the lock during the execution.

Figure 8A:
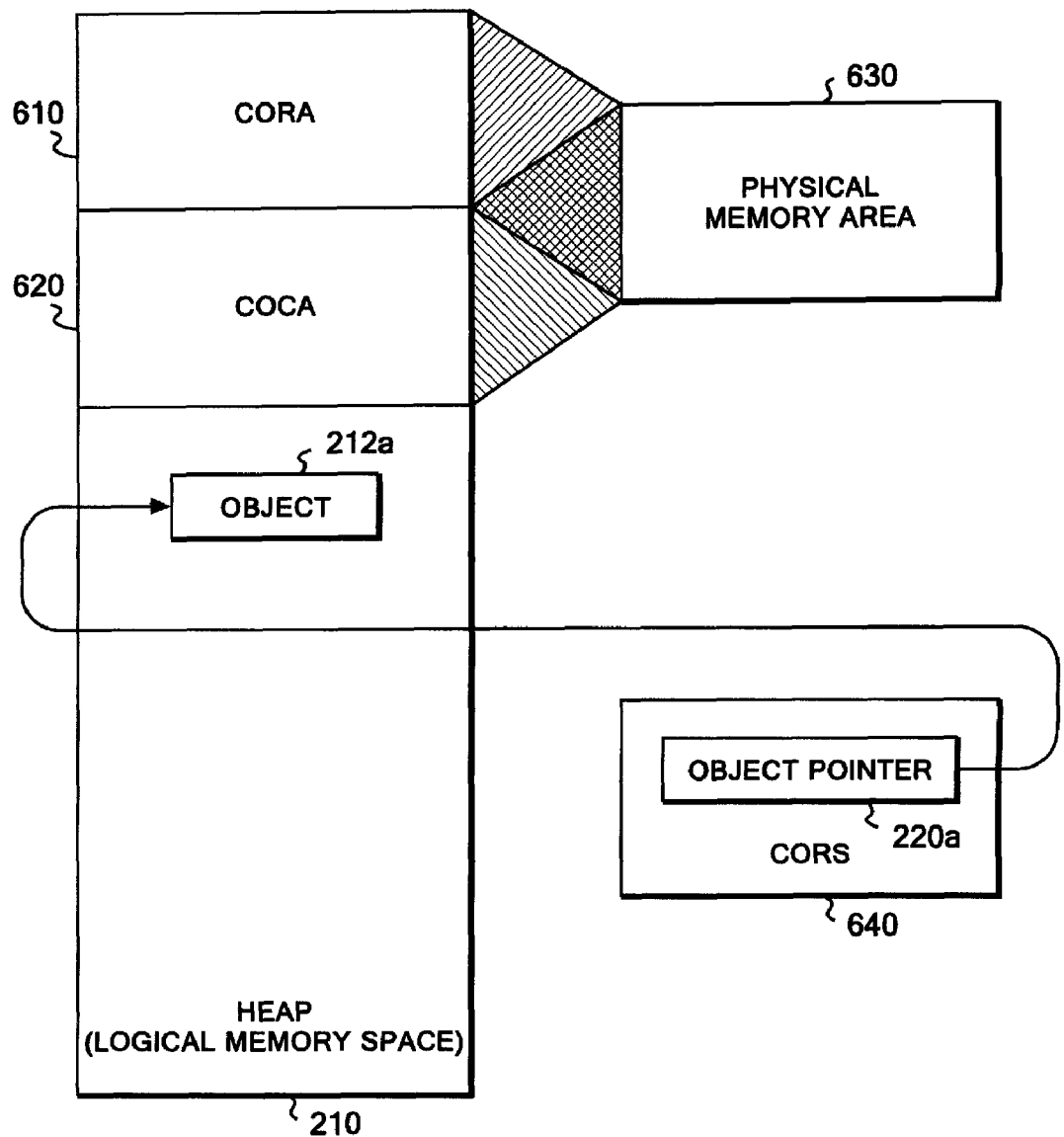
FIG. 8A illustrates an example of a storage unit after Step S720 in FIG. 7B in accordance with an embodiment of the present invention.

FIG. 8A illustrates an example of the storage unit 120 after Step S720 in accordance with the embodiment of the present invention. Specifically, FIG. 8A illustrates an example of the storage unit 120 after the object 212*a* set with the become-_barrier flag is registered in the CORS 640 by the switching unit 150 at Step S720. The CORS 640 includes the object pointer 220*a* retaining the logical address of the object 212*a* whose value is assumed constant.

Figure 8B:
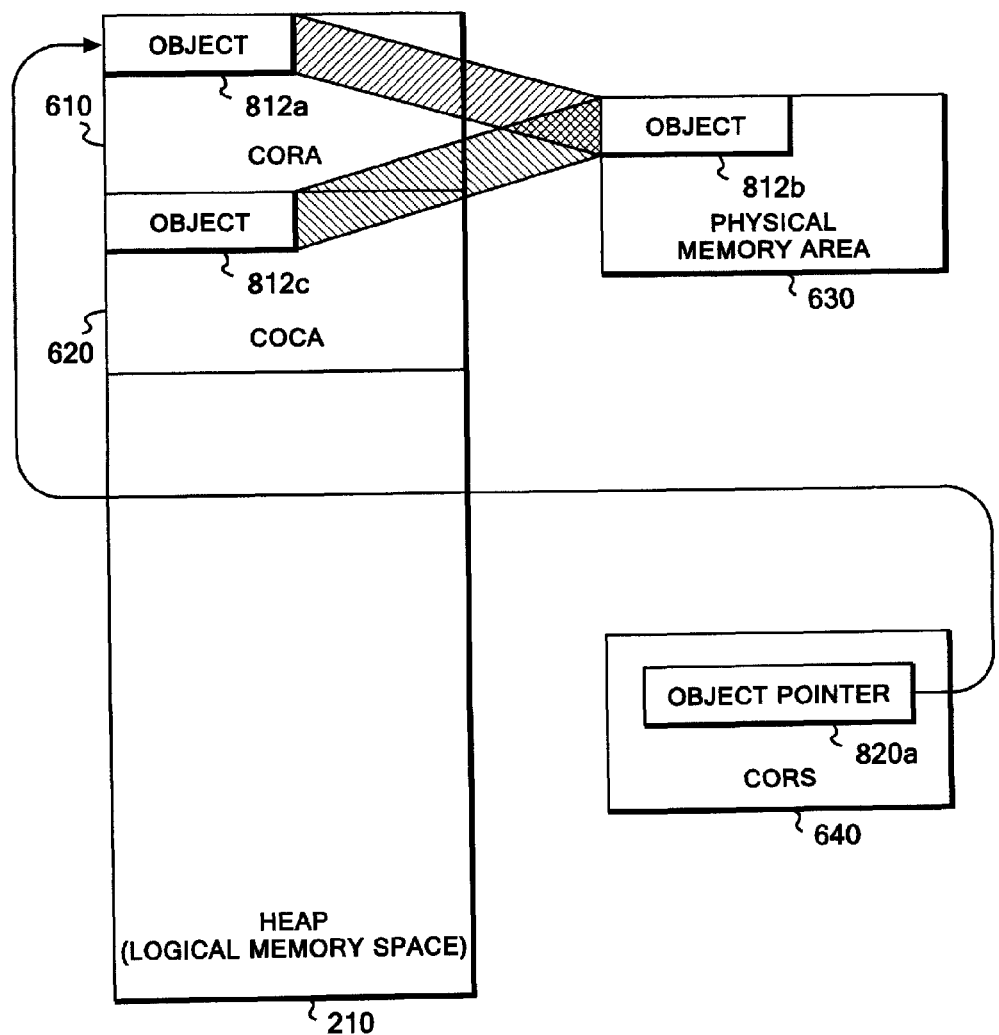
FIG. 8B illustrates an example of the storage unit after Step S722 in FIG. 7B in accordance with an embodiment of the present invention.

FIG. 8B illustrates an example of the storage unit 120 after Step S722 in accordance with the embodiment of the present invention. Specifically, FIG. 8A illustrates an example of the storage unit 120 after the switching unit 150 moves the object 212*a* set with the become_barrier flag by generating an object 812*a*, i.e., a copy of the object 212*a*, and then registers an object pointer 820*a* pointing to the object 812*a* into the CORS 640 at Step S722. The physical memory area 630 stores therein an object 812*b* which is an entity of the object 812*a*. The object 812*b* is automatically mapped as an object 812*c* in an area of the COCA 620. The management unit 170 can write the management information on the object 812*b* by accessing the object 812*c*.

Note that, in a case where, in all embodiments of the present invention, the apparatus 100 can use a write instruction to set the condition flag in response to an event in which the code execution unit 140 performs the writing to the unprivileged write-disabled area or the write-disabled virtual area, the code generation unit 130 can generate the optimized code using the write instruction to set the condition flag instead of the unprivileged write instruction to the unprivileged write-disabled area or instead of the write instruction to the write-disabled virtual area. This write instruction to set the condition flag is set depending on the occurrence rate of the access exception, the operation cost for the access exception, and the operation cost for checking the condition flag.

The code generation unit 130 can generate the optimized code where a write instruction in a format, such as ST (Addr), data, or cond_reg, is used as the write instruction to set the condition flag. The cond_reg is an operand for specifying a register in which the condition flag is stored. When the write instruction is successfully executed, the processor may set zero in the cond_reg. When the write instruction results in failure, the processor may set a value indicating a corresponding exception in the cond_reg. The exception can be any exception caused by the result of the write instruction, e.g., the SEGV exception or the page fault (PF) exception.

The writing detection unit 160 can detect the cond_reg being set, instead of detecting the exception event, after the write instruction to set the condition flag is executed. The writing detection unit 160 can be implemented as a check point which is executed for checking the condition flag after the write instruction to set the condition flag is executed.

When the writing detection unit 160 detects the cond_reg being set, the switching unit 150 can instruct the code execution unit 140 to execute the unoptimized code of the target program instead of the optimized code of the target program. In this way, the code execution unit 140 can execute the target program at higher speed when the runtime of the optimized code that is optimized on condition that the value of the accessed object is constant is sufficiently high and further when the frequency of the writing to the unprivileged write-disabled area by the unprivileged write instruction or the writing to the write-disabled virtual area is relatively high.

Figure 9:
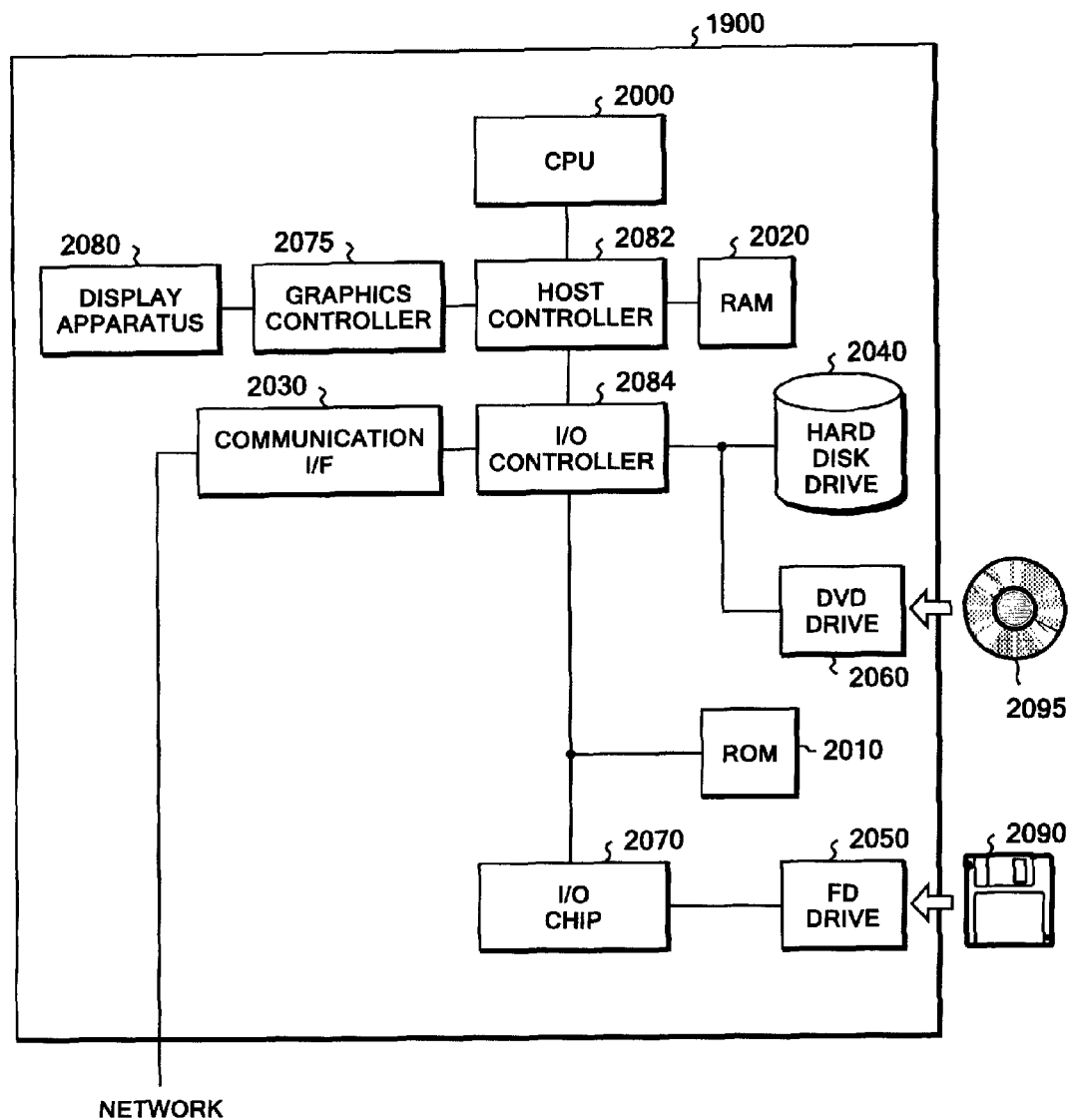
FIG. 9 illustrates an exemplary computer hardware configuration in accordance with an embodiment of the present invention.

FIG. 9 illustrates an exemplary hardware configuration of a computer 1900 in accordance with still another embodiment of the present invention. The computer 1900 of the embodiment includes a CPU-peripheral component: a CPU 2000, a RAM 2020, a graphics controller 2075, and a display apparatus 2080, which are connected together by a host controller 2082. The computer 1900 includes an I/O component: a communication interface 2030, a hard-disk drive 2040, and a DVD drive 2060, which are connected via an I/O controller 2084 to the host controller 2082. The computer 1900 includes a legacy I/O component: a ROM 2010, a flexible-disk drive 2050, and an I/O chip 2070, which are connected to the I/O controller 2084.

The host controller 2082 connects the RAM 2020 with the CPU 2020 and the graphics controller 2075 accessing the RAM 2020 at high transmission rate. The CPU 2000 is used by programs stored in the ROM 2010 and the RAM 2020 and controls other components. The graphics controller 2075 obtains image data generated on a frame buffer of the RAM 2020 by the CPU 2000 or the like, and displays an image based on the image data on the display apparatus 2080. The graphics controller 2075 can internally include the frame buffer for storing therein the image data generated by the CPU 2000 or the like.

The I/O controller 2084 connects the host controller 2082 with the communication interface 2030, the hard-disk drive 2040, and the DVD drive 2060, which are I/O devices operated at relatively high transmission rate. The communication interface 2030 communicates with other devices via the network. The hard-disk drive 2040 stores therein programs and data used by the CPU 2000 in the computer 1900. The DVD drive 2060 reads programs or data from a DVD 2095 and provides the programs or data for the hard-disk drive 2040 via the RAM 2020.

The I/O controller 2084 is connected with the ROM 2010, the flexible-disk drive 2050, and the I/O chip 2070, which are I/O devices operated at relatively low transmission rate. The ROM 2010 stores therein a boot program executed in the startup of the computer 1900 and/or programs and the like that are dependent on hardware of the computer 1900. The flexible-disk drive 2050 reads programs or data from the flexible disk 2090 and provides the programs or data for the hard-disk drive 2040 via the RAM 2020. The I/O chip 2070 connects the flexible-disk drive 2050 with the I/O controller 2084 and also connects various kinds of I/O devices with the I/O controller 2084 via ports such as a parallel port, a serial port, a keyboard port, and a mouse port, for example.

Programs installed in the hard-disk drive 2040 via the RAM 2020 are provided by users via a storage medium such as the flexible disk 2090, the DVD 2095, and the IC card storing therein the programs. The programs are read from the storage medium, installed onto the hard-disk drive 2040 in the computer 1900 via the RAM 2020, and then executed by the CPU 2000.

The program that is installed in the computer 1900 and causes the computer 1900 to function as the apparatus 100 includes the code storage unit 110, the storage unit 120, the code generation unit 130, the code execution unit 140, the switching unit 150, the writing detection unit 160, the management unit 170, and the writing processing unit 180. The program or modules cause the CPU 2000 and the like to make the computer 1900 run as the code storage unit 110, the storage unit 120, the code generation unit 130, the code execution unit 140, the switching unit 150, the writing detection unit 160, the management unit 170, and the writing processing unit 180.

Information operations described in these programs are read by the computer 1900, so that the information operations function as the code storage unit 110, the storage unit 120, the code generation unit 130, the code execution unit 140, the switching unit 150, the writing detection unit 160, the management unit 170, and the writing processing unit 180, which are specific means implemented by the cooperation of software and various kinds of hardware resources described above. These specific means carry out the calculation or processing of information according to the intended use purposes of the computer 1900, whereby the apparatus 100 meeting the purposes is uniquely constituted.

For instance, when the computer 1900 communicates with external devices and the like, the CPU 2000 executes a communication program loaded on the RAM 2020 and instructs the communication interface 2030 to execute a communication operation based on the operation contents described in the communication program. The communication interface 2030 under control of the CPU 2000 reads transmission data stored in a transmission buffer area or the like provided in a storage device such as the RAM 2020, the hard-disk drive 2040, the flexible disk 2090, or the DVD 2095, and then transmits the transmission data to the network. The communication interface 2030 under control of the CPU 2020 can also write reception data received via the network into a reception buffer area or the like provided in a storage device. Thus, the communication interface 2030 can transfer the transmission/reception data to and from the storage device by using a DMA (Direct Memory Access) method. Alternatively, the CPU 2000 can read data from the storage device or the communication interface 2030 as a transmission source, and then write the data into the communication interface 2030 or the storage device as a transmission destination, whereby the transmission/reception data can be transferred therebetween.

The CPU 2000 causes the RAM 2020 to load all or only a necessary portion of files or database stored in an external storage device such as the hard-disk drive 2040, the DVD drive 2060 (DVD 2095), or the flexible-disk drive 2050 (flexible disk 2090) via DMA transfer or the like, and then processes various kinds of operations on the data on the RAM 2020. Then, the CPU 2000 causes the RAM 2020 to write the processed data back into the external storage device via DMA transfer or the like. In such operations, the RAM 2020 temporarily stores therein the contents of the external storage device. Therefore, in the embodiment, the RAM 2020 and the external storage device are collectively referred to as a memory, the storage unit 120, the storage device, or the like. Various kinds of information such as various kinds of programs, data, tables, and databases in the embodiment are stored in such storage devices and are treated as target for information processing. The CPU 2000 can store a part of information loaded on the RAM 2020 in a cache memory and read/write the information via the cache memory. In such an embodiment, the cache memory functions as a part of the RAM 2020. Therefore, in this embodiment, the cache memory is also included in the RAM 2020, the memory, and/or the storage device unless otherwise specified.

The CPU 2000 processes data read from the RAM 2020 through various kinds of processing specified by sequences of instructions of the program, and then writes the resultant data back into the RAM 2020. Here, the various kinds of processing include various calculations, information processing, conditional determination, and information search/replacement, and the like. For example, when the CPU 2000 performs the conditional determination, the CPU 2000 compares each of various variables described in the embodiment with another variable or constant, and determines whether a condition is met such as a condition the variable $>$, $<$, $\geq$, $\leq$, or $=$ the other variable or constant. When the condition is met (or when the condition is not met), the CPU 2000 causes a branch of a different sequence of instructions or calls a subroutine.

The CPU 2000 can search for information stored in files, databases, and the like in the storage device. Take as an example a case where the storage device stores therein multiple entries each of which the attribute value of a first attribute is associated with the attribute value of a second attribute. In this case, the CPU 2000 searches these entries stored in the storage device to find an entry whose attribute value of the first attribute matches a specified condition and then reads the attribute value of the second attribute of the matching entry, whereby the CPU 2000 can obtain the attribute value of the second attribute associated with the first attribute which meets the specified condition.

The programs and modules described above can be stored in an external recording medium. Such a recording medium can be an optical recording medium such as a DVD and a CD, an optical magnetic recording medium such as an MO, a tape medium, a semiconductor memory such as an IC card, as well as the flexible-disk 2090 and the DVD 2095. Furthermore, a storage device, such as a hard disk and a RAM, that is provided in a server system connected to a dedicated communication network or the Internet can be used as such a recording medium, so that the program can be provided for the computer 1900 via the network.

The present invention has been so far described with reference to the embodiments, but the technical scope of the present invention is not limited to the scope described in the embodiments. It is obvious that various kinds of modifications or improvement can be applied by a person skilled in the art to the above-described embodiments. It is clear from descriptions in claims that embodiments with such modifications or improvement are also within the technical scope of the present invention.

It should be noted that processes of operations, procedures, steps, stages and the like performed in the apparatus, the system, the program, or the method illustrated in claims, the description, or the drawings can be performed in any order unless the processes are described with terms such as "previously" or "before" or unless the output of the previous process is used in the subsequent process. In the scope of claims, the description or the operation flows in the drawings, terms such as "to begin with" and "then" are used merely for convenience of readers but does not mean that the processes are to be performed in this order.

What is claimed is:
1. An apparatus for optimizing a Java object, comprising:
   a storage unit for storing a value of said object and management information on said object in association with each other;
   a code generation unit for generating, from said target computer program, optimized code that is optimized on the condition that said value of said object is constant, and unoptimized code that is to be executed in a case where said value of said object is changed;
   a switching unit for switching from executing said target computer program by using said optimized code to executing said target computer program by using said unoptimized code in response to an event in which said value of said object is written while said target computer program is executed by using said optimized code; and a management unit for managing said object by accessing said management information by a non-detection write operation in which writing to said object is performed without being detected;

wherein when switching to executing said target computer program by using said optimized code, said switching unit places said object into an unprivileged write-disabled area of said storage unit where writing by a privileged write instruction is allowed to be performed without being detected while writing by an unprivileged write instruction is detected;

said code generation unit translates said writing to said value of said object by said target computer program into said unprivileged write instruction; and said management unit processes said writing to said management information on said object by using said privileged write instruction; and wherein when switching to executing said target computer program by using said unoptimized code, said switching unit places said object into a write-enabled area of said storage unit where writing by said privileged write instruction and said unprivileged write instruction are allowed to be performed without being detected.

2. The apparatus according to claim 1, wherein said switching unit sets writing to said value of said object as detectable when said switching unit switches from executing said target computer program by using said unoptimized code to executing said target computer program by using said optimized code.

3. The apparatus according to claim 1, wherein said storage unit stores, as at least a part of said management information, write-restriction information indicating whether writing to said value of said object by said target computer program is restricted or not; said management unit causes said target computer program to be executed by using said optimized code in a case where said storage unit stores said write-restriction information indicating that said writing to said value of said object by said target computer program is restricted, and said management unit causes said target computer program to be executed by using said unoptimized code in a case where said storage unit stores said write-restriction information indicating that said writing to said value of said object by said target computer program is not restricted; and said switching unit writes said write-restriction information, indicating that said writing to said value of said object by said target computer program is not restricted, into said management information on said object, when switching to executing said target computer program by said unoptimized code, whereas said switching unit writes said write-restriction information, indicating that said writing to said value of said object by said target computer program is restricted, into said management information on said object, when switching to executing said target computer program by using said optimized code.

4. The apparatus according to claim 3, wherein:

said storage unit stores, as a part of said management information on said object, optimization information indicating whether said object is to be optimized or not;

said code generation unit sets said object with said optimization information indicating that said object is to be optimized in a case where said object is to be optimized on the condition that said value of said object is constant; and said switching unit switches to executing said target computer program by using said optimized code in a case where said optimization information indicating that said object is to be optimized is stored in association with said object.

5. The apparatus according to claim 4, wherein during garbage collection which examines each said object stored in said storage unit and releases said object not used by said target computer program from said storage unit, said switching unit moves said examined object in said write-enabled area to said unprivileged write-disabled area in a case where said optimized information indicating that said object is to be optimized is stored in association with said examined object.

6. The apparatus according to claim 5, wherein in response to an event that writing is performed to said object placed in said unprivileged write-disabled area, said switching unit sets said object with said write-restriction information indicating that writing to said value of said object is not restricted and said optimization information indicating that said object is not to be optimized.

7. The apparatus according to claim 6, wherein during said garbage collection, said switching unit moves said examined object in said unprivileged write-disabled area to said write-enabled area in a case where said optimization information indicating that said object is not to be optimized is stored in association with said examined object.

8. The apparatus according to claim 1, wherein when switching to executing said target computer program by using said optimized code, said switching unit places said object into a physical memory area mapped to both a write-disabled virtual area where writing is disabled and a write-enabled virtual area where writing is enabled in a virtual memory space;

said code generation unit generates code causing writing to said value of said object by said target computer program to be processed via said write-disabled virtual area, and said management unit processes writing to said management information on said object via said write-enabled virtual area.

9. The apparatus according to claim 8, wherein when switching to executing said target computer program by using said unoptimized code, said switching unit moves the object into said physical memory area in said storage unit mapped to said write-enabled virtual area.

10. The apparatus according to claim 8, wherein:

said switching unit makes such allocation that each said object to be optimized is stored in any one of an address position in said write-disabled virtual area and an address position in said write-enabled virtual area that are shifted from each other by a predetermined offset; and said management unit calculates said address position in said write-disabled virtual area of said object on the basis of said address position in said write-enabled area of said object and said offset, and writes said management information on said object by using said calculated address position.

11. The apparatus according to claim 10, further comprising:

a writing processing unit that processes, in response to an event that writing to said object via said write-disabled virtual area is detected, said writing via said write-enabled virtual area, wherein said management unit writes said management information on said object via said write-disabled virtual area when the frequency of writing said management information on said object is lower than a predetermined standard frequency, and said management unit writes said management information on said object via said write-enabled virtual area on the condition that said object is placed in said physical memory area mapped to said write-disabled virtual area and said write-enabled virtual area, when said frequency of writing said management information is equal to or higher than said predetermined standard frequency.

12. An apparatus for optimizing a Java object on a target computer program, said apparatus comprising:
a storage unit for storing a value of said object and management information on said object in association with each other;
a code generation unit for generating, from said target computer program, optimized code that is optimized on the condition that said value of said object is constant, and unoptimized code that is to be executed in a case where said value of said object is changed;
a switching unit for switching from executing said target computer program by using said optimized code to executing said target computer program by using said unoptimized code in response to an event in which said value of said object is written while said target computer program is executed by using said optimized code;
a management unit for managing said object by accessing said management information by a non-detection write operation in which writing to said object is performed without being detected; and
a physical memory area mapped to both a write-disabled virtual area where writing is disabled and a write-enabled virtual area where writing is enabled in a virtual memory space;
wherein when switching to executing said target computer program by using said optimized code, said switching unit places said object into an unprivileged write-disabled area of said storage unit where writing by a privileged write instruction is allowed to be performed without being detected while writing by an unprivileged write instruction is detected;
said code generation unit translates said writing to said value of said object by said target computer program into said unprivileged write instruction; and
said management unit processes said writing to said management information on said object by using said privileged write instruction; and
wherein when switching to executing said target computer program by using said unoptimized code, said switching unit places said object into a write-enabled area of said storage unit where writing by said privileged write instruction and said unprivileged write instruction are allowed to be performed without being detected.

13. A computer-implemented method of optimizing a Java object on a target computer program, said method comprising:
storing a value of said object and management information on said object in association with each other in a storage unit;
generating, by a code generation unit from said target computer program, optimized code that is optimized on the condition that said value of said object is constant, and unoptimized code that is to be executed in a case where said value of said object is changed;
switching, by a switching unit from executing said target computer program, by using said optimized code to executing said target computer program by using said unoptimized code in response to an event in which said value of said object is written while said target computer program is executed by using said optimized code; and
managing said object by a management unit accessing said management information by a non-detection write operation in which writing to said object is performed without being detected;
wherein when switching to executing said target computer program by using said optimized code, said switching unit places said object into an unprivileged write-disabled area of said storage unit where writing by a privileged write instruction is allowed to be performed without being detected while writing by an unprivileged write instruction is detected;
said code generation unit translates said writing to said value of said object by said target computer program into said unprivileged write instruction; and
said management unit processes said writing to said management information on said object by using said privileged write instruction; and
wherein when switching to executing said target computer program by using said unoptimized code, said switching unit places said object into a write-enabled area of said storage unit where writing by said privileged write instruction and said unprivileged write instruction are allowed to be performed without being detected.

14. A non-transitory article of manufacture tangibly embodying computer readable instructions which when implemented, causes a computer to carry out the steps of a computer-implemented method of optimizing a Java object on a target computer program according to claim 13.

* * * * *